J. E. COFFIN & L. W. MORSE, Jr.
PAPER-CUTTING MACHINE.

No. 174,198. Patented Feb. 29, 1876.

WITNESSES.
Lemuel Clift
Frank W. Patty

INVENTOR.
John E. Coffin
Leonard W. Morse Jr.

UNITED STATES PATENT OFFICE.

JOHN E. COFFIN, OF MYSTIC RIVER, AND LEONARD W. MORSE, JR., OF GROTON, CONNECTICUT.

IMPROVEMENT IN PAPER-CUTTING MACHINES.

Specification forming part of Letters Patent No. 174,198, dated February 29, 1876; application filed October 13, 1875.

*To all whom it may concern:*

Be it known that we, JOHN E. COFFIN, of Mystic River, and LEONARD W. MORSE, Jr., of Groton, in the county of New London, and State of Connecticut, have invented certain new and useful Improvements in Paper-Cutting Machines; and we do hereby declare that the following specification, taken in connection with the drawings making a part of the same, is a full, clear, and exact description thereof.

Figure 1:
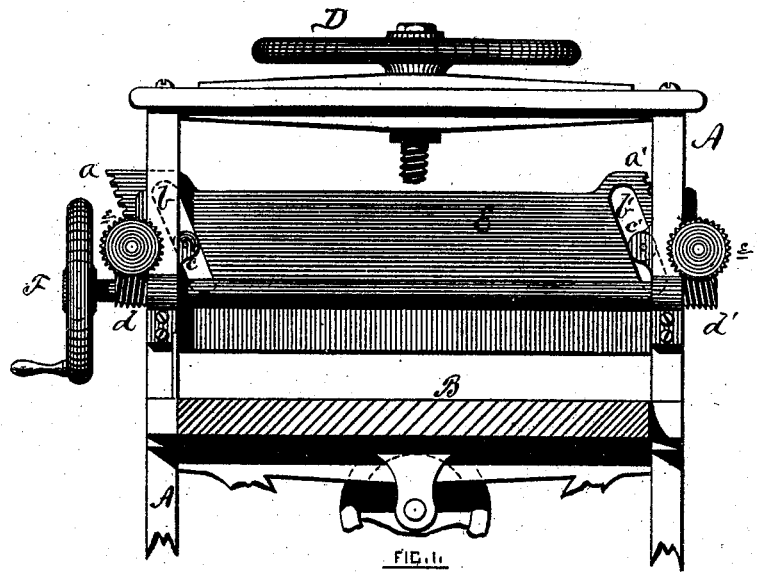
Figure 2:
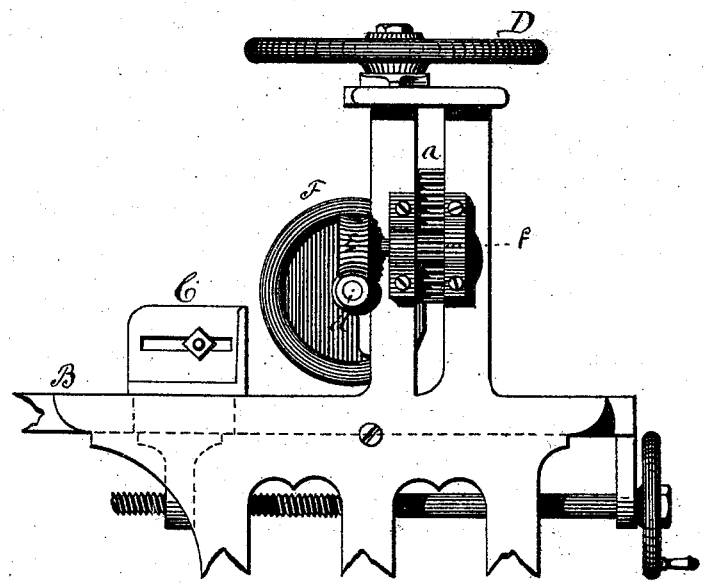

Figure 1 is a partial front elevation exhibiting the improvement. Fig. 2 is an end view.

Paper-cutting machines in general use have heretofore been usually so constructed that the knife-bar is operated by means of a lever which is combined with the bar through the medium of pivoted connecting toggle-links. The object of the present improvement is to dispense with such link-connections and operate the knife-bar by a geared connection between the knife-bar and the source of power.

Referring to the accompanying drawings, A is the usual frame of a machine of this class. B is the platform upon which the paper is placed. C is the adjustable gauge against which the edge of the pile to be cut is placed, and D is the screw which works the clamp to compress the sheets. E is the knife-bar which carries the cutting-knife projecting below its under surface, and is mounted in suitable guides in the uprights of the frame of the machine. The ends of the knife-bar are shaped on lines which are upon any preferred line oblique with the line of the edge of the knife, and are furnished with geared racks, $a\ a'$, Fig. 1.

Parallel with the racks $a\ a'$ oblique slots $b\ b'$ are cut in the bar, and when the bar is mounted in the machine, stud-pins attached to the uprights of the frame and carrying friction-rollers $c\ c'$ are entered in such slots. The function which such stud-pins, in combination with the slots or equivalent inclined guides, perform is to cause the knife-bar in its downward movement to be moved sidewise, and thus enable the knife to make a "draw-cut" as it passes through the pile of paper.

The necessary motion for the knife-bar is derived from the transverse shaft F, to which, by means of a crank or driving-pulley, the power is applied. This shaft is mounted in bearings formed in suitable brackets attached to the uprights of the frame, and is furnished near both its ends with worm-screws $d\ d'$. These screws respectively engage with worm-gears $e\ e'$, which are keyed to the ends of short shafts supported in bearings attached to the uprights of the frame, as shown at Fig. 2. These shafts carry pinions $f f'$, the teeth of which engage respectively with the teeth of the racks $a\ a'$ on the ends of the knife-bar.

It is apparent from this construction described that when motion is given to the driving-shaft F, the knife-bar will be moved downward toward the surface of the table in a diagonal line corresponding with the angle at which the slots $b\ b'$ and the racks $a\ a'$ are inclined to the longitudinal axis of the knife-bar. Upon revolving the shaft F in the opposite direction the knife-bar will be raised. It is obvious that under this arrangement any amount of power can be obtained which is required for the work.

We are aware that inclined slots and rollers have heretofore been employed for imparting to the knife-bar a longitudinal movement or draw-cut, in combination with mechanism for vertically operating the knife-bar. In our machine the vertical and longitudinal movement of the knife-bar is directly effected by the combined action of the rack-gears at each end of the knife-bar and the revolving-gears with which they respectively engage, and the inclined slots serve to guide the knife-bar in its longitudinal movement and to maintain its rack-gearing in proper working relations with the revolving gears.

What we claim as our invention, and desire to secure by Letters Patent, is—

1. The means, substantially as described, for operating the knife-bar and giving a draw-cut movement to the knife in a paper-cutting machine, which consists in constructing the knife-bar with toothed racks $a\ a'$ parallel with each other and inclined relatively to the longitudinal axis of the bar, and combining therewith toothed pinions $f f'$, worked by suitable worm gears and screws, as specified.

2. The combination with a knife-bar, provided with a rack-gear at each end, of the guiding-slots and rollers, substantially as described.

JOHN E. COFFIN.
LEONARD W. MORSE, JR.

Witnesses:
LEMUEL CLIFT,
FRANK N. BATTY.